United States Patent
Moon et al.

(10) Patent No.: US 8,717,951 B2
(45) Date of Patent: May 6, 2014

(54) METHOD FOR ALLOCATING RADIO RESOURCES IN FDD FRAME

(75) Inventors: Sung Ho Moon, Anyang-si (KR); Minseok Noh, Anyang-si (KR); Yeong Hyeon Kwon, Anyang-si (KR); Jin Sam Kwak, Anyang-si (KR); Dong Cheol Kim, Anyang-si (KR); Seung Hee Han, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 474 days.

(21) Appl. No.: 12/921,033

(22) PCT Filed: Feb. 26, 2009

(86) PCT No.: PCT/KR2009/000913
§ 371 (c)(1),
(2), (4) Date: Sep. 3, 2010

(87) PCT Pub. No.: WO2009/110695
PCT Pub. Date: Sep. 11, 2009

(65) Prior Publication Data
US 2011/0019597 A1    Jan. 27, 2011

Related U.S. Application Data

(60) Provisional application No. 61/033,769, filed on Mar. 4, 2008.

(30) Foreign Application Priority Data

Jun. 17, 2008    (KR) .................. 10-2008-0056966

(51) Int. Cl.
*H04J 1/00*    (2006.01)
(52) U.S. Cl.
USPC ............................ 370/281; 370/295; 370/330

(58) Field of Classification Search
None
See application file for complete search history.

(56) References Cited

U.S. PATENT DOCUMENTS

| | | | |
|---|---|---|---|
| 6,587,444 B1 * | 7/2003 | Lenzo et al. .................. | 370/330 |
| 6,993,339 B2 | 1/2006 | Skillermark et al. | |
| 7,149,527 B2 | 12/2006 | Chen et al. | |

(Continued)

FOREIGN PATENT DOCUMENTS

KR    10-2007-0064264 A    6/2007

*Primary Examiner* — Brian D Nguyen
*Assistant Examiner* — Roberta A Shand
(74) *Attorney, Agent, or Firm* — Birch, Stewart, Kolasch & Birch, LLP

(57) ABSTRACT

A method of allocating a radio resource in a frequency division duplex (FDD) frame in which a downlink frame and an uplink frame are divided in a frequency domain in a wireless communication system includes allocating a downlink resource region for a first system in the downlink frame, and allocating an uplink resource region for the first system to the uplink frame such that the uplink resource region does not temporally overlap with the downlink resource region for the first system, wherein a resource region except for the downlink resource region for the first system is allocated to a downlink resource region for a second system in the downlink frame, and a resource region except for the uplink resource region for the first system is allocated to an uplink resource region for the second system in the uplink frame. When a half-duplex FDD (H-FDD)-type user equipment is supported in a frequency division duplex (FDD) frame supporting heterogeneous systems, radio resources can be effectively utilized by minimizing waste of unnecessary radio resources.

6 Claims, 13 Drawing Sheets

(56) References Cited

U.S. PATENT DOCUMENTS

| | | |
|---|---|---|
| 7,151,755 B2 * | 12/2006 | Xu .................................. 370/330 |
| 7,313,116 B2 * | 12/2007 | Lee et al. ......................... 370/335 |
| 7,844,289 B2 * | 11/2010 | Bykovnikov .................. 455/502 |
| 8,160,101 B2 * | 4/2012 | Kwak et al. .................... 370/471 |
| 8,310,961 B2 * | 11/2012 | Chindapol et al. ............. 370/277 |
| 2007/0140166 A1 | 6/2007 | Eichinger et al. |
| 2009/0092067 A1 * | 4/2009 | Sudarshan et al. ............. 370/281 |

* cited by examiner

METHOD FOR ALLOCATING RADIO RESOURCES IN FDD FRAME

CROSS-REFERENCE TO RELATED APPLICATIONS

This application claims the benefit of priority of U.S. Provisional application No. 61/033,769 filed on Mar. 4, 2008, and Korean Patent application No. 10-2008-0056966 filed on Jun. 17, 2008, all of which are incorporated by reference in their entirety herein.

BACKGROUND OF THE INVENTION

1. Field of the Invention

The present invention relates to wireless communications, and more particularly, to a method and apparatus of allocating a radio resource in a frequency division duplex (FDD) frame capable of effectively supporting a half-duplex FDD (H-FDD) type user equipment.

2. Related Art

The institute of electrical and electronics engineers (IEEE) 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 (hereinafter, IEEE 802.16e) was completed in 2005 in a format of 'corrigendum'.

Communication between a base station (BS) and a user equipment (UE) includes downlink (DL) transmission from the BS to the UE and uplink (UL) transmission from the UE to the BS. A system profile based on the existing IEEE 802.16e supports a time division duplex (TDD) scheme in which DL transmission and UL transmission are divided in a time domain. In the TDD scheme, UL transmission and DL transmission are performed at different times by using the same frequency band. The TDD scheme has an advantage in that frequency selective scheduling is simply performed since a UL channel characteristic and a DL channel characteristic are reciprocal.

At present, there is ongoing standardization effort for the IEEE 802.16m standard which is a new technical standard based on the IEEE 802.16e. The IEEE 802.16e system considers not only a frequency division duplex (FDD) scheme but also a half-duplex FDD (H-FDD) scheme. In the FDD scheme, DL transmission and UL transmission are simultaneously performed by using different frequency bands. In the H-FDD scheme, DL transmission and UL transmission are performed at different times by using different frequency bands. That is, the H-FDD scheme does not perform DL transmission and UL transmission simultaneously, and a DL radio resource and a UL radio resource are not allocated to a UE using the H-FDD scheme in the same time domain.

An evolution system evolved from a legacy system has to be designed to operate by incorporating the legacy system, which is referred to as backward compatibility. The evolution system employing the FDD scheme and the H-FDD scheme is evolved from the legacy system supporting the TDD scheme and has to effectively support the FDD scheme and the H-FDD scheme while satisfying backward compatibility. However, a frame structure capable of effectively supporting backward compatibility of the H-FDD scheme while satisfying backward compatibility with the legacy system has not been clearly proposed yet.

In addition, heterogeneous wireless communication systems using different communication schemes may share a frequency band. When the heterogeneous wireless communication systems use the frequency band in an FDD-type frame by dividing the frequency band according to time division multiplexing (TDM), a frame structure needs to be designed by considering a UE that uses the H-FDD scheme. However, the frame structure capable of effectively supporting the H-FDD scheme and the heterogeneous wireless communication systems has not been clearly introduced yet.

SUMMARY OF THE INVENTION

The present invention provides a frequency division duplex (FDD) frame capable of effectively supporting a half-duplex FDD (H-FDD) scheme and heterogeneous systems.

In an aspect, a method of allocating a radio resource in a frequency division duplex (FDD) frame in which a downlink frame and an uplink frame are divided in a frequency domain in a wireless communication system is provided. The method include allocating a downlink resource region for a first system in the downlink frame, and allocating an uplink resource region for the first system to the uplink frame such that the uplink resource region does not temporally overlap with the downlink resource region for the first system, wherein a resource region except for the downlink resource region for the first system is allocated to a downlink resource region for a second system in the downlink frame, and a resource region except for the uplink resource region for the first system is allocated to an uplink resource region for the second system in the uplink frame.

In another aspect, a method of transmitting data by using a frequency division duplex (FDD) frame is provided. The method include transmitting first data through a downlink region for a first system, and receiving second data through an uplink region for a second system using a different communication scheme from the first system while transmitting the first data, wherein an uplink region for the first system is allocated in a time region different from the downlink region for the first system.

DESCRIPTION OF EXEMPLARY EMBODIMENTS

Figure 1:
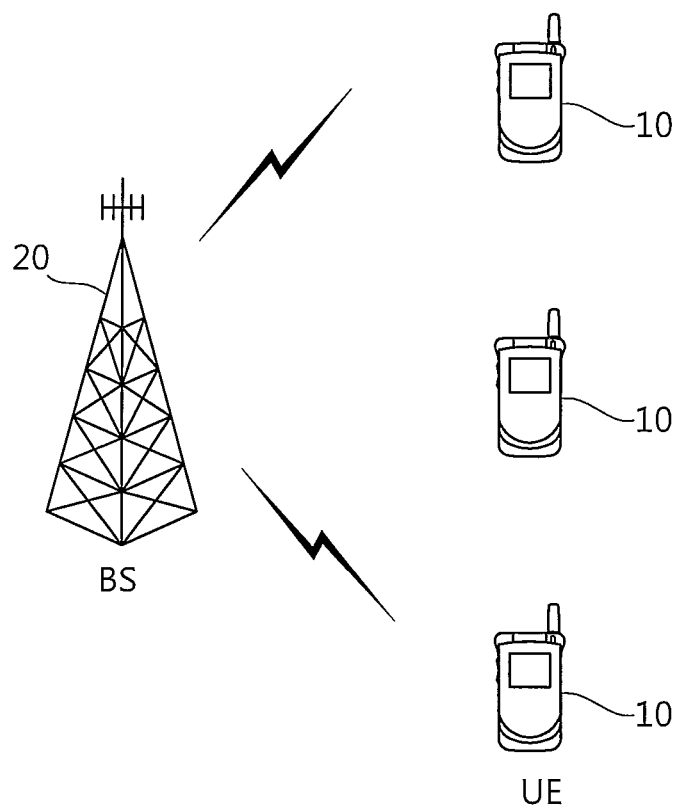
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There may be one or more cells within the coverage of the BS 20.

A downlink (DL) represents a communication link from the BS 20 to the UE 10, and an uplink (UL) represents a communication link from the UE 10 to the BS 20. In the DL, a transmitter may be a part of the BS 20, and a receiver may be a part of the UE 10. In the UL, the transmitter may be a part of the UE 10, and the receiver may be a part of the BS 20.

There is no restriction on the multiple access scheme used in the wireless communication system. Examples of the multiple access scheme are various, such as code division multiple access (CDMA), time division multiple access (TDMA), frequency division multiple access (FDMA), single-carrier FDMA (SC-FDMA), and orthogonal frequency division multiple access (OFDMA).

The BS 20 has at least one cell. The cell is an area in which the BS 20 provides a communication service. Different communication schemes can be used in one cell. That is, heterogeneous wireless communication systems may exist while sharing a communication service area. Hereinafter, the heterogeneous wireless communication systems or heterogeneous systems refer to systems using different communication schemes. For example, the heterogeneous systems may be systems using different access schemes, or may be a legacy system and an evolution system supporting backward compatibility with the legacy system.

Hereinafter, the proposed frame is for a case where the heterogeneous systems share a frequency band, and is not limited to a type or definition of the heterogeneous systems. For convenience of explanation, it is assumed that one of the heterogeneous systems is defined as a system A and the other one is defined as a system B. It is assumed that the two systems share a frequency band in a frequency division duplex (FDD) frame by using a time division multiplexing (TDM) scheme. In the TDM scheme, a radio resource is divided along a time domain in the same frequency band. It is also assumed that there is no delay factor having an effect on propagation delay between a transmitter and a receiver and synchronization between a DL frame and a UL frame. A time relation between DL and UL may be controlled by being relatively shifted to the extent of a specific delay factor occurring in actual implementation.

Figure 2:
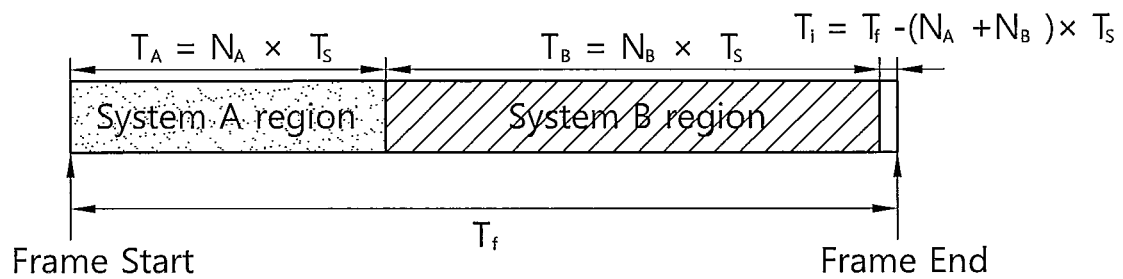
FIG. 2 shows a frame structure supporting heterogeneous systems.

FIG. 2 shows a frame structure supporting heterogeneous systems.

Referring to FIG. 2, in the frame structure, a system A and a system B are divided along a time domain in a full frequency band. That is, in the frame structure, a region for the system A and a region for the system B are multiplexed using a TDM scheme. A DL frame and a UL frame of each of the system A region and the system B region may be an FDD frame in which the frames are divided along a frequency domain.

The frame may be defined as a specific time duration. Assume that a frame length in the time domain is $T_f$, one symbol length is $T_s$, the number of symbols allocated to the system A is $N_A$, and the number of symbols allocated to the system B is $N_B$. An idle time of the frame is defined as $T_i = T_f - (N_A + N_B) \times T_s$. When the frame is defined as the time duration, a start of the frame can be defined as an end of an idle time of a previous frame, and an end of the frame may be defined as an end of an idle time of the corresponding frame.

The idle time may differ depending on a cyclic prefix (CP) length for avoiding inter-symbol interference.

Table 1 shows an example of parameters of the frame.

TABLE 1

| Transmission Bandwidth (MHz) | 5 | 10 | 20 |
|---|---|---|---|
| Over-sampling factor | | 28/25 | |
| Sampling Frequency (MHz) | 5.6 | 11.2 | 22.4 |
| FFT Size | 512 | 1024 | 2048 |
| Sub-carrier Spacing (kHz) | | 10.94 | |
| OFDM symbol time, Tu (us) | | 91.4 | |

| Cyclic Prefix (CP) | Ts (us) | OFDM symbols per Frame | Idle time (us) |
|---|---|---|---|
| Tg = ¼ Tu | 91.4 + 22.85 = 114.25 | 43 | 87.25 |
| Tg = ⅛ Tu | 91.4 + 11.42 = 102.82 | 48 | 64.64 |
| Tg = 1/16 Tu | 91.4 + 5.71 = 97.11 | 51 | 47.39 |
| Tg = 1/32 Tu | 91.4 + 2.86 = 94.26 | 53 | 4.22 |

According to the CP length, the number of OFDM symbols changes, and a size of the idle time changes. The idle time is a duration that cannot be used for data transmission. The size of the idle time is decreased as much as possible or the idle time is removed to increase efficiency of a radio resource. The parameters of Table 1 can be applied to a frame described hereinafter. However, the present invention is not limited thereto, and thus various parameters can also be applied in addition to the parameters of Table 1 above.

Figure 3:
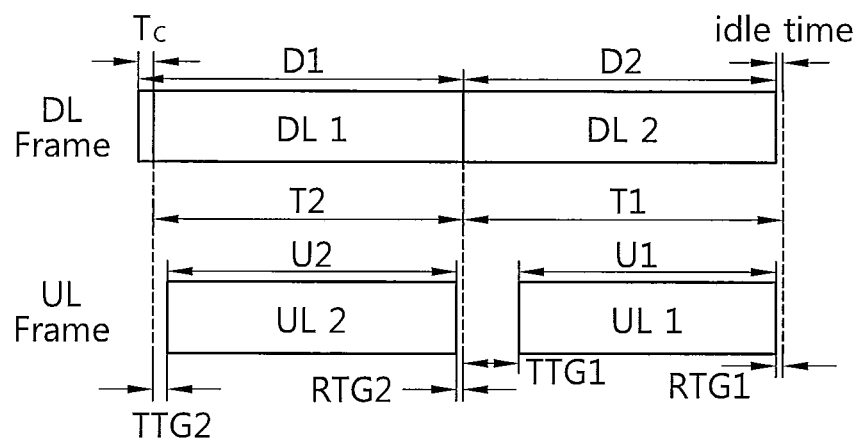
FIG. 3 shows an example of an FDD frame structure for supporting an H-FDD scheme.

FIG. 3 shows an example of an FDD frame structure for supporting an H-FDD scheme.

Referring to FIG. 3, in order to support the H-FDD scheme, an FDD frame can be divided into two parts in a time domain. A DL frame is divided into a first DL region DL1 and a second DL region DL2. A UL frame is divided into a second UL region UL2 and a first UL region UL1. The DL frame includes a control duration Tc for transmitting essential information (e.g., system information) that must be received by all UEs.

UL transmission is not performed in the control duration. An idle time is located at an end portion of the frame.

Since DL transmission and UL transmission are not performed simultaneously in the H-FDD scheme, UEs can be divided into two groups. UEs of a first group transmit and receive data by using the first DL region DL1 and the first UL region UL1 and UEs of a second group transmit and receive data by using the second DL region DL2 and the second UL region UL2.

A guard time is allocated between the DL region and the UL region. The guard time is a time required when a UE changes a communication mode from DL to UL or from UL to DL. In an H-FDD type UE, one radio frequency (RF) module requires a time for changing transmission and reception states and a time for changing a frequency band used for transmission and reception. A transmit/receive transition gap (TTG) 1 is allocated between the first DL region DL 1 and the first UL region UL 1 used by the UEs of the first group. The TTG 1 is a time required to change the communication mode from DL to UL. A receive/transmit transition gap (RTG) 1 is allocated between the first UL region UL1 and its subsequent region, i.e., the first DL region DL1. The RTG 1 corresponds to the TTG 1, and is a time required to change the communication mode from UL to DL. Likewise, a TTG 2 and an RTG 2 are allocated for the change of UL/DL between a second DL region DL2 and a second UL region UL2 used by the UEs of the second group.

If radio resources available in the DL frame are denoted by D1 and D2, radio resources accessible by the H-FDD type UE in the UL frame are denoted by T1 and T2, corresponding to the D1 and D2. The radio resources accessible by the H-FDD type UE imply maximum radio resources which do not overlap temporally between UL and DL. According to the above definitions, radio resources useful in the UL frame except for the control duration Tc, the guard time, the idle time $T_i$, and the TTG/RTG can be denoted by U1 and U2. This can be expressed by Equation 1.

$$U1=T1-(TTG1+RTG1)=D2+Ti-Tg1, \text{ where } Tg1=TTG1+RTG1$$

$$U2=T2-(TTG2+RTG2)=D1-Tc-Tg2, \text{ where } Tg2=TTG2+RTG2 \quad \text{[Equation 1]}$$

In case of T1, it is possible to utilize an additional radio resource to the extent of the idle time by properly locating the idle time.

Figure 4:
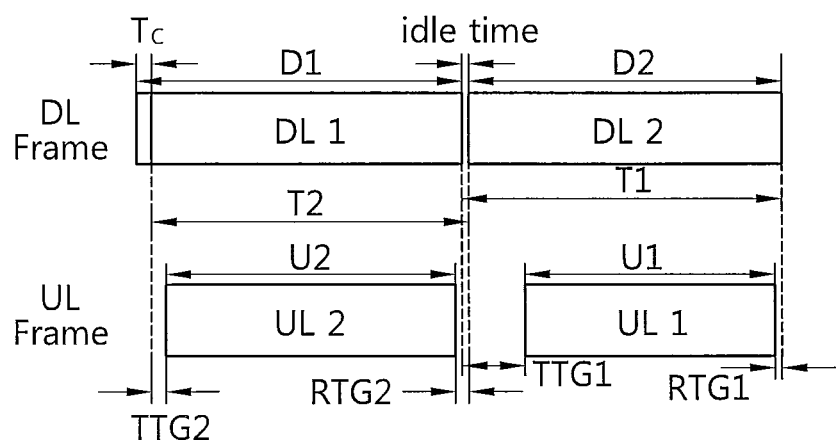
FIG. 4 shows another example of an FDD frame structure for supporting an H-FDD scheme.

FIG. 4 shows another example of an FDD frame structure for supporting an H-FDD scheme. In this case, an additional radio resource is utilized to the extent of an idle time by locating the idle time differently from the example of FIG. 3.

Referring to FIG. 4, an idle time is located at a center of a frame. That is, the idle time is located between a first DL region DL1 and a first UL region UL 1 or between a second UL region UL 2 and a second DL region DL 2. The idle time is included in a TTG 1 and an RTG 2.

Radio resources U1 and U2 available in the UL frame are expressed by Equation 2.

$$U1=T1-(TTG1+RTG1)=D2+Ti-Tg1, \text{ where } Tg1=TTG1+RTG1$$

$$U2=T2-(TTG2+RTG2)=D1+Ti-Tc-Tg2, \text{ where } Tg2=TTG2+RTG2 \quad \text{[Equation 2]}$$

When the idle time is located at an end portion of the frame, the idle time is included only in T1, whereas when the idle time is located at the center of the frame, the idle time is included in both T1 and T2 and thus U2 is increased to the extent of the idle time $T_i$. Therefore, the second UL region UL2 can utilize an additional radio resource to the extent of the idle time. That is, the TTG and the RTG are the most dominant factors for determining UL radio resources available in the frame for supporting the H-FDD scheme, and an amount of the available UL radio resources can be increased by properly locating the idle time so that the idle time is included in the TTG or the RTG.

In the FDD frame for supporting the H-FDD scheme, the TTG or RTG required when the UE changes a transmission/reception state is about 300 us. When considering both UEs of a first group and UEs of a second group, a radio resource about 600 us is used as the TTG or the RTG in one frame. This is a significant loss for the radio resource. Therefore, there is a need to decrease waste of limited radio resources by minimizing radio resources used for the TTG or the RTG.

Now, an FDD frame capable of supporting heterogeneous systems and also supporting an H-FDD scheme while decreasing waste of unnecessary radio resource will be described.

Figure 5:
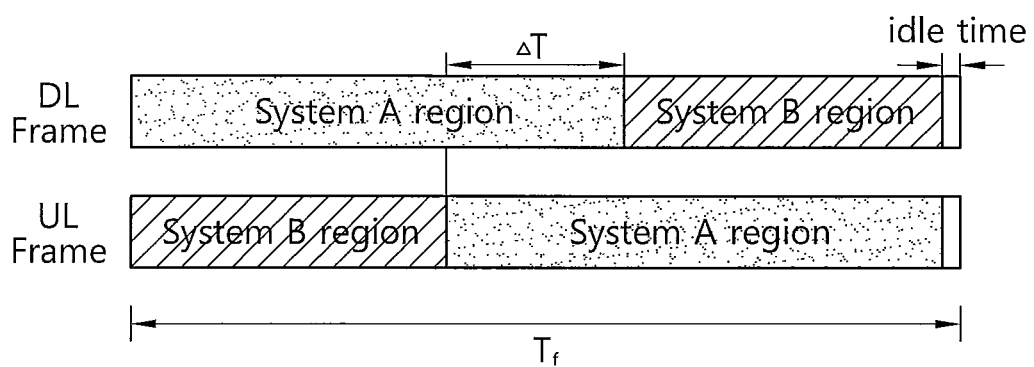
FIG. 5 shows an FDD frame structure supporting heterogeneous systems and an H-FDD scheme according to an embodiment of the present invention.

FIG. 5 shows an FDD frame structure supporting heterogeneous systems and an H-FDD scheme according to an embodiment of the present invention.

Referring to FIG. 5, an FDD frame is divided into a DL frame and a UL frame in a frequency domain. In the DL frame and the UL frame, a system A region and a system B region are divided in a time domain by using a TDM scheme. In this case, in order to effectively support the H-FDD scheme, the system B region and the system A region are allocated in the UL frame in the opposite order of the system A region and the system B region allocated in the DL frame. In the DL frame and the UL frame, the system A region has a portion ΔT overlapping in the time domain, whereas the system B region is separated by ΔT without overlapping in the time domain. An idle time is allocated at an end portion of the FDD frame. A size of the idle time can be determined depending on an FDD frame size $T_f$ and a size of an OFDM symbol including a CP length.

Since a system B DL region and a system B UL region are separated by ΔT in the time domain, a TTG or RTG for an H-FDD type UE of the system B may not be allocated. For example, if the idle time is greater than a time required when the H-FDD type UE of the system B switches from DL to UL, there is no need to additionally prepare the TTG. In addition, if ΔT is greater than a time required when the H-FDD type UE of the system B switches from UL to DL, there is no need to additionally prepare the RTG. That is, the system B DL region and the system B UL region can be both allocated for the H-FDD type UE without a loss caused by the TTG and the RTG. Even if the idle time is less than the TTG, the TTG can be removed or the loss caused by the TTG can be decreased by locating a DL duration for the H-FDD UE to a front portion of the system B DL region. Further, even if ΔT is less than the RTG, the RTG can be removed or the loss caused by the RTG can be decreased by ΔT by locating a DL duration for the H-FDD UE to a front portion of the system B UL region.

As such, in an FDD frame in which heterogeneous systems are multiplexed using a TDM scheme, a radio resource loss caused by the TTG or RTG can be decreased or removed by allocating a DL region and a UL region of any one of the two systems such that the regions are separated from each other in a time domain while avoiding overlapping.

It is described herein that the system A region and the system B region are allocated in the same ratio in the DL frame and the UL frame. However, the system A region and the system B region may be allocated with a different ratio in the DL frame and the UL frame. By allowing the DL frame and the UL frame to have a different order of multiplexing the system A region and the system B region by using the TDM scheme, radio resource waste caused by the TTG or RTG for supporting the H-FDD type UE can be decreased, thereby increasing system efficiency.

Figure 6:
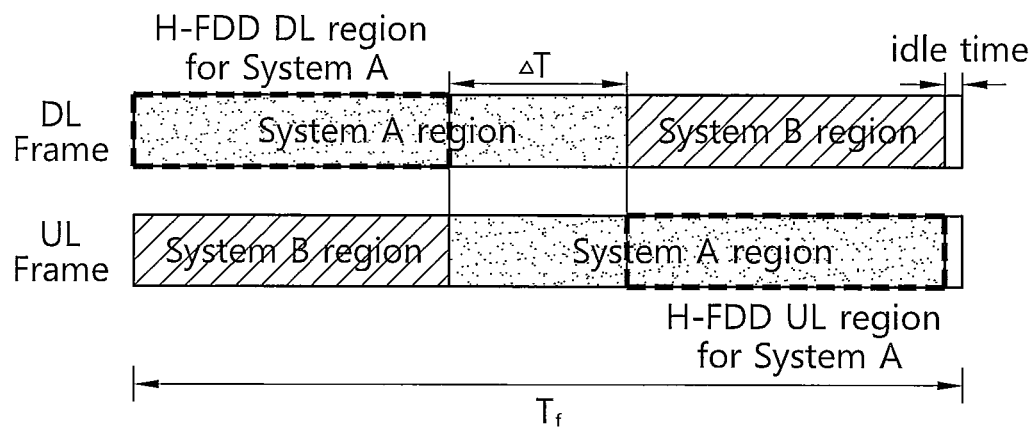
FIG. 6 shows an FDD frame structure supporting heterogeneous systems and an H-FDD scheme according to another embodiment of the present invention.

FIG. 6 shows an FDD frame structure supporting heterogeneous systems and an H-FDD scheme according to another embodiment of the present invention. This is a case where an H-FDD type UE of a system A is supported in the FDD frame structure of FIG. 5.

Referring to FIG. 6, a system A region which uses more radio resources than a system B region in an FDD frame has an overlapping portion ΔT in a time domain. A region except for the portion ΔT in the system A region is allocated to a radio resource for the H-FDD type UE of the system A. That is, a region except for the portion ΔT in the system A region of the DL frame is used as an H-FDD DL region for the system A, and a region except for the portion ΔT in the system A region of the UL region is used as an H-FDD UL region for the system A.

As such, by allocating the region except for the portion ΔT in the system A region to the H-FDD type UE, similarly to the system B, a TTG or RTG for the H-FDD type UE of the system A is not additionally allocated, and thus a radio duration wasted by the TTG/RTG can be decreased. In the system A, system efficiency can be increased by decreasing a radio resource waste caused by the TTG or RTG for supporting the H-FDD type UE.

The radio resource of the portion ΔT can be allocated to a UE not using the H-FDD scheme. Alternatively, the region except for the portion ΔT in the system A region is allocated to the H-FDD type UE without limitation, and the portion ΔT can be allocated to the H-FDD type UE by scheduling while avoiding overlapping in the time domain.

The system B region of the DL frame and the system B region of the UL frame can be allocated to the H-FDD type UE of the system B without limitation, and in doing so, the H-FDD type UE of the system B can transmit and receive data. The system A region except for the portion ΔT in the DL frame and the UL frame can be allocated to the H-FDD type UE of the system A without limitation, and in doing so, the H-FDD type UE of the system A can transmit and receive data. A BS can transmit data to the H-FDD type UE of the system B while receiving data from the H-FDD type UE of the system A by using the proposed FDD frame. Alternatively, the BS can receive data from the H-FDD type UE of the system B while transmitting data to the H-FDD type UE of the system A.

Hereinafter, an FDD frame which supports heterogeneous systems and in which a radio resource can be effectively allocated to an H-FDD type UE by allowing a DL frame and a UL frame to have a different start point will be described.

It is assumed that a system A region and a system B region are allocated in the same ratio and same order in the DL frame and the UL frame, and an idle time is allocated at an end of the DL frame and the UL frame. A start of the DL frame is defined as an end of an idle time of a previous DL frame. A start of the UL frame is defined as an end of an idle time of a previous UL frame. An end of the DL frame is defined as an end of an idle time of the corresponding DL frame. An end of the UL frame is defined as an end of an idle time of the corresponding UL frame.

A start point of the UL frame is shifted by a specific time offset with respect to a start point of the DL frame. Although it is described herein that the start point of the UL frame is delayed by the specific time offset with respect to the start point of the DL frame, the same effect can also be obtained in the opposite case where the start point of the DL frame is delayed by the specific time offset with respect to the start point of the UL frame. In addition, since UL or DL is repeated continuously in a frame unit, a delay effect resulted from the offset can equally apply to consecutive frames.

Figure 7:
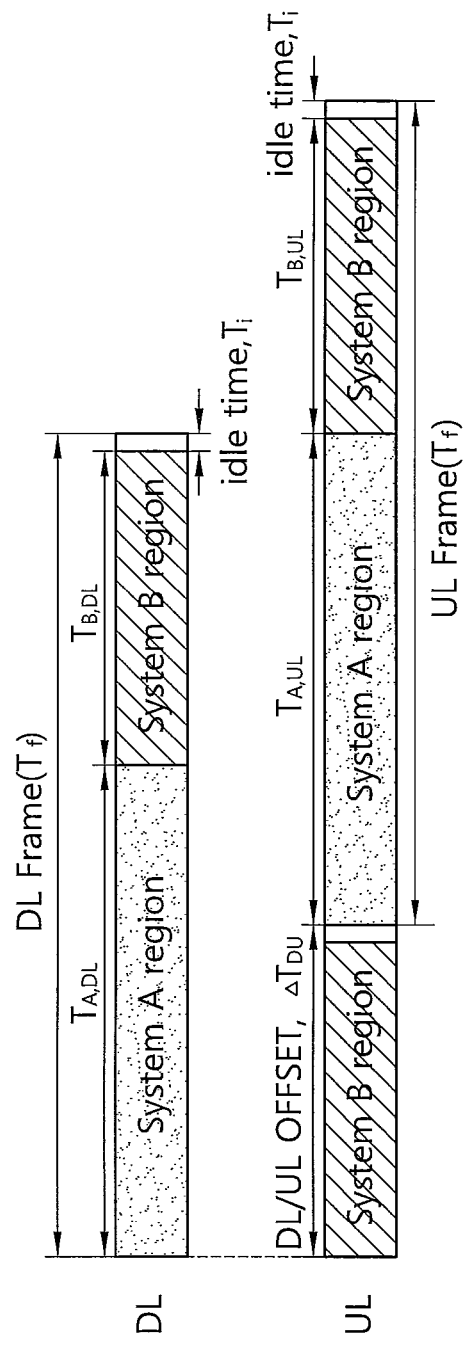
FIG. 7 shows an FDD frame structure supporting heterogeneous systems and an H-FDD scheme according to another embodiment of the present invention.

FIG. 7 shows an FDD frame structure supporting heterogeneous systems and an H-FDD scheme according to another embodiment of the present invention.

Referring to FIG. 7, a start point of a UL frame is shifted from a start point of a DL frame by a DL/UL offset in a time domain.

Equation 3 shows an example of a DL/UL offset $\Delta T_{DU}$ which is a positive value indicating a relative position of the UL frame against the DL frame.

$$\Delta T_{DU} = T_{B,UL} + T_i \quad \text{[Equation 3]}$$

Herein, $T_{B,UL}$ denotes a system B region of the UL frame. When the UL frame is shifted by $T_{B,UL}$ (i.e., the system B region of the UL frame) and $T_i$ (i.e., an idle time), a boundary between the system B region and the system A region of the UL frame matches an end of the DL frame.

The system A region of the DL frame (i.e., $T_{A,DL}$) and the system A region of the UL frame (i.e., $T_{A,UL}$) have an temporally overlapping portion, whereas the system B region of the DL frame (i.e., $T_{B,DL}$) and the system B region of the UL frame (i.e., $T_{B,UL}$) do not have the temporally overlapping portion. Therefore, the system B region can be allocated to the H-FDD type UE without limitation. If the idle time has an enough size to replace the TTG, the system B does not have to allocate the RTG additionally. In the system A region, a region except for the temporally overlapping region can be allocated to the H-FDD type UE without limitation.

Figure 8:
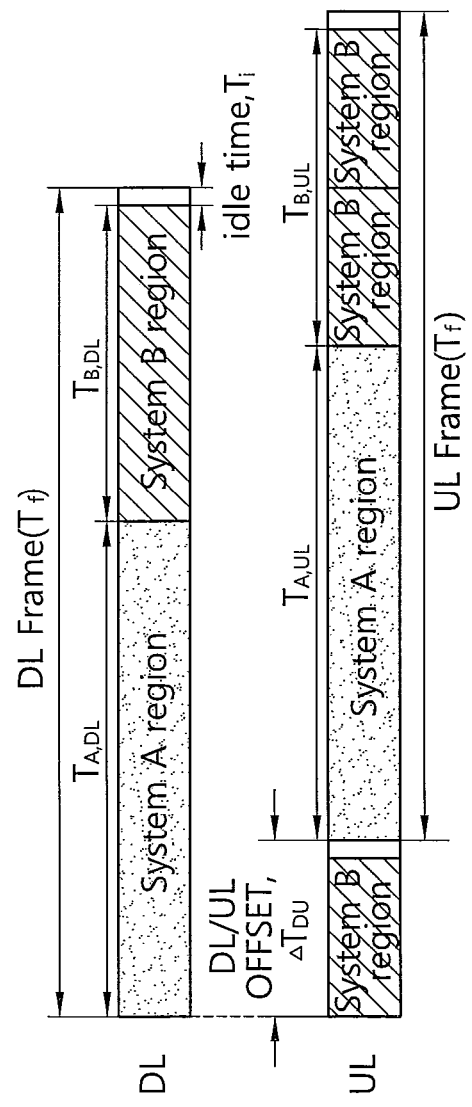
FIG. 8 shows an FDD frame structure supporting heterogeneous systems and an H-FDD scheme according to another embodiment of the present invention.

FIG. 8 shows an FDD frame structure supporting heterogeneous systems and an H-FDD scheme according to another embodiment of the present invention.

Referring to FIG. 8, a start point of a UL frame can be shifted by a DL/UL offset in a time domain from a start point of a DL frame by determining the DL/UL offset to any value.

If the DL/UL offset is determined to be less than a value of a system B region of a UL frame (i.e., $T_{B,UL}$) and an idle time (i.e., $T_i$), a system A region of a DL frame (i.e., $T_{A,DL}$) and a system A region of the UL frame (i.e., $T_{A,UL}$) have a temporally overlapping portion, and a system B region of the DL frame ($T_{B,DL}$) and the system B region of the UL frame ($T_{B,UL}$) also have a temporally overlapping portion. In both the system A region and the system B region, a region except for the temporally overlapping region can be allocated to an H-FDD type UE. If the temporally overlapping portion increases in the DL frame and the UL frames, a region that can be allocated to the H-FDD type UE without limitation may decrease.

Figure 9:
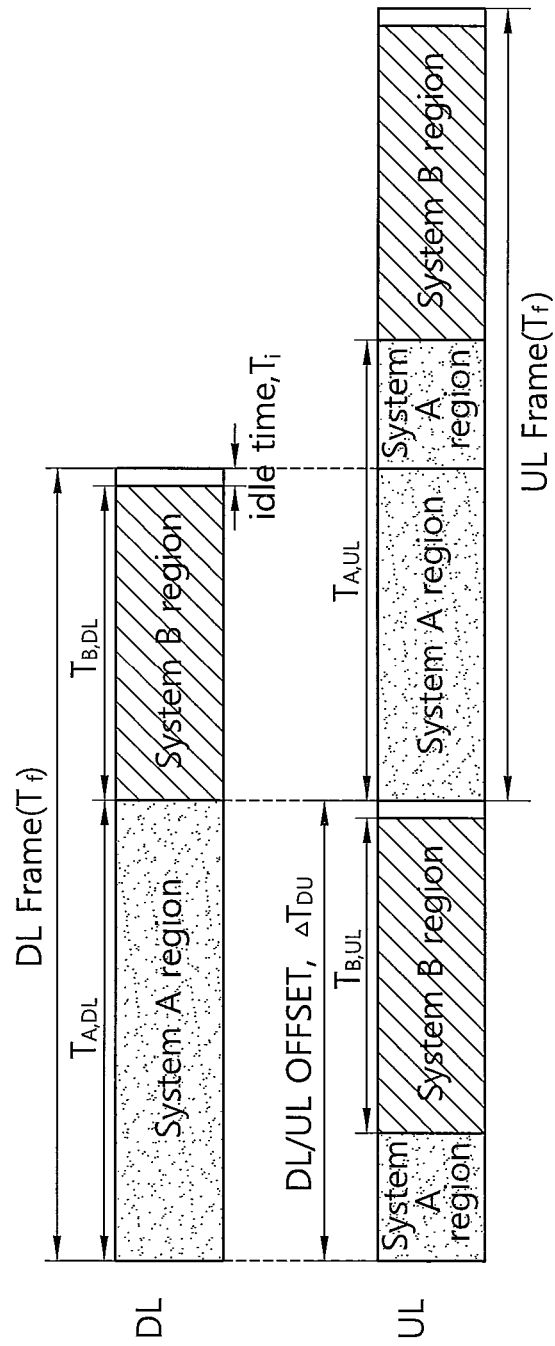
FIG. 9 shows an FDD frame structure supporting heterogeneous systems and an H-FDD scheme according to another embodiment of the present invention.

FIG. 9 shows an FDD frame structure supporting heterogeneous systems and an H-FDD scheme according to another embodiment of the present invention.

Referring to FIG. 9, a start point of a UL frame is shifted from a start point of a DL frame by a DL/UL offset of a system A region of a DL frame (i.e., $T_{A,DL}$) in a time domain.

Equation 4 shows another example of a DL/UL offset $\Delta T_{DU}$.

$$\Delta T_{DU} = T_{A,DL} \quad \text{[Equation 4]}$$

A start of the UL frame matches a boundary between the system A region and the system B region of the DL frame.

The system B region of the DL frame (i.e., $T_{B,DL}$) and the system B region of the UL frame ($T_{B,UL}$) do not have a temporally overlapping portion. The system B region of the DL frame (i.e., $T_{B,DL}$) is separated from the system B region of the UL frame ($T_{B,UL}$) by an idle time. If the idle time has an enough time to replace an RTG, the system B does not have to allocate the RTG additionally. The system B region can be allocated to an H-FDD type UE without limitation. In the system A region, a region except for the temporally overlapping portion can be allocated to the H-FDD type UE without limitation.

Figure 10:
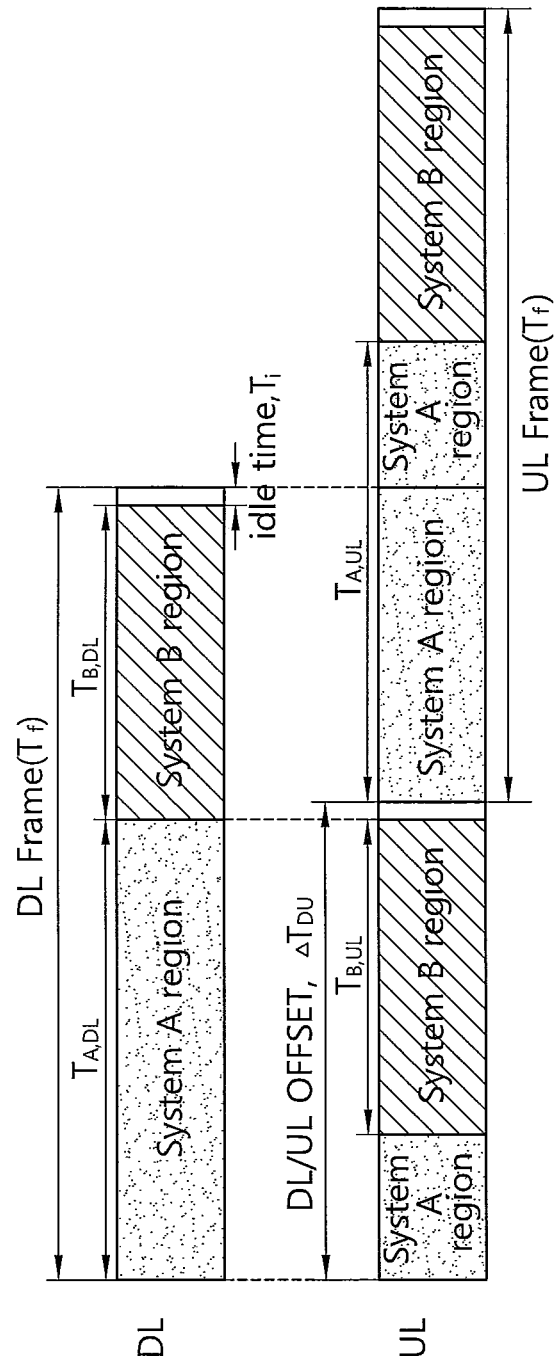
FIG. 10 shows an FDD frame structure supporting heterogeneous systems and an H-FDD scheme according to another embodiment of the present invention.

FIG. 10 shows an FDD frame structure supporting heterogeneous systems and an H-FDD scheme according to another embodiment of the present invention.

Referring to FIG. 10, a start point of a UL frame is shifted from a start point of a DL frame by a DL/UL offset of a system A region of a DL frame (i.e., $T_{A,DL}$) and an idle time (i.e., $T_i$) in a time domain.

Equation 5 shows another example of a DL/UL offset $\Delta T_{DU}$.

$$\Delta T_{DU} = T_{A,DL} + T_i \qquad \text{[Equation 5]}$$

A start of the UL frame is located in a position delayed by the idle time $T_i$ from a boundary between the system A region and the system B region of the DL frame.

The system B region of the DL frame (i.e., $T_{B,DL}$) and the system B region of the UL frame ($T_{B,UL}$) do not have a temporally overlapping portion. The system B region of the UL frame (i.e., $T_{B,UL}$) is separated from the system B region of the DL frame ($T_{B,DL}$) by the idle time and a UL duration of the system A of a specific duration. If the idle time has an enough time to replace a TTG, the system B does not have to allocate the TTG additionally. In the system B region, a region except for a portion to be used as the RTG can be allocated to an H-FDD type UE. In the system A region, a region except for the temporally overlapping portion can be allocated to the H-FDD type UE without limitation.

Figure 11:
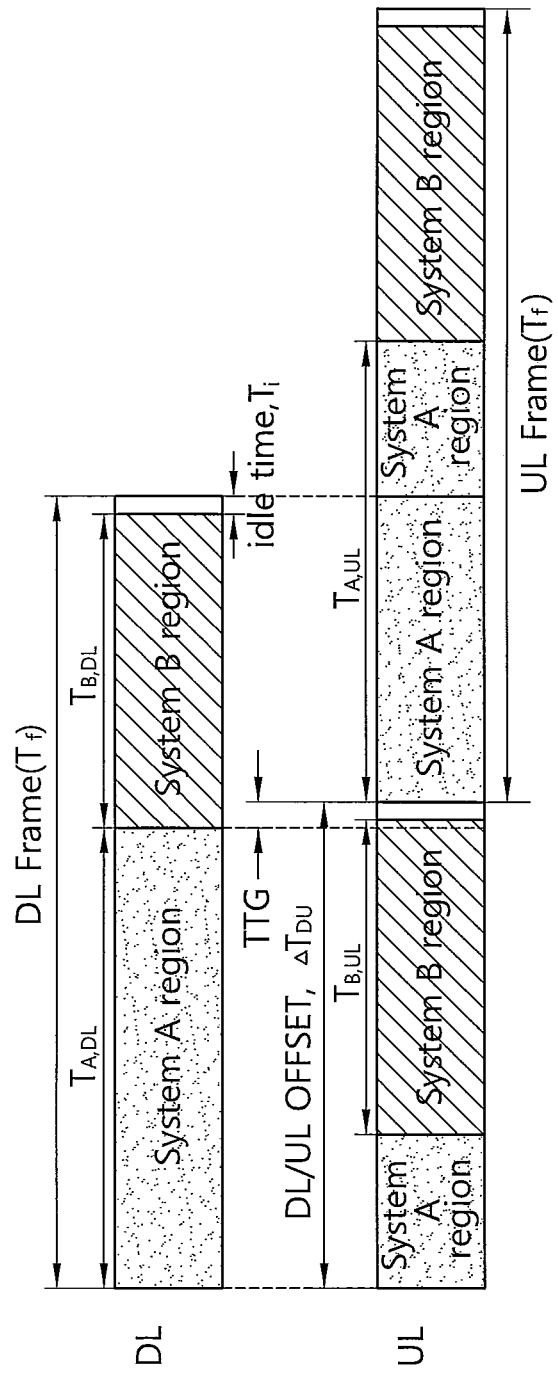
FIG. 11 shows an FDD frame structure supporting heterogeneous systems and an H-FDD scheme according to another embodiment of the present invention.

FIG. 11 shows an FDD frame structure supporting heterogeneous systems and an H-FDD scheme according to another embodiment of the present invention.

Referring to FIG. 11, a start point of a UL frame is shifted from a start point of a DL frame by a system A region of a DL frame (i.e., $T_{A,DL}$) and a DL/UL offset of a system A region of a DL frame in a time domain.

Equation 6 shows another example of a DL/UL offset $\Delta T_{DU}$.

$$\Delta T_{DU} = T_{A,DL} + TTG \qquad \text{[Equation 6]}$$

A start of the UL frame is located in a position delayed by a TTG of the system A from a boundary between the system A region and the system B region of the DL frame.

Since a system A region of a UL frame (i.e., $T_{A,UL}$) is separated from a system A region of a DL frame (i.e., $T_{A,DL}$) by the TTG, the system A does not have to allocate the TTG additionally. In the system A region, a region except for the temporally overlapping portion can be allocated to the H-FDD type UE without limitation. In the system B region, a region except for some overlapping portions can be allocated to the H-FDD type UE.

Figure 12:
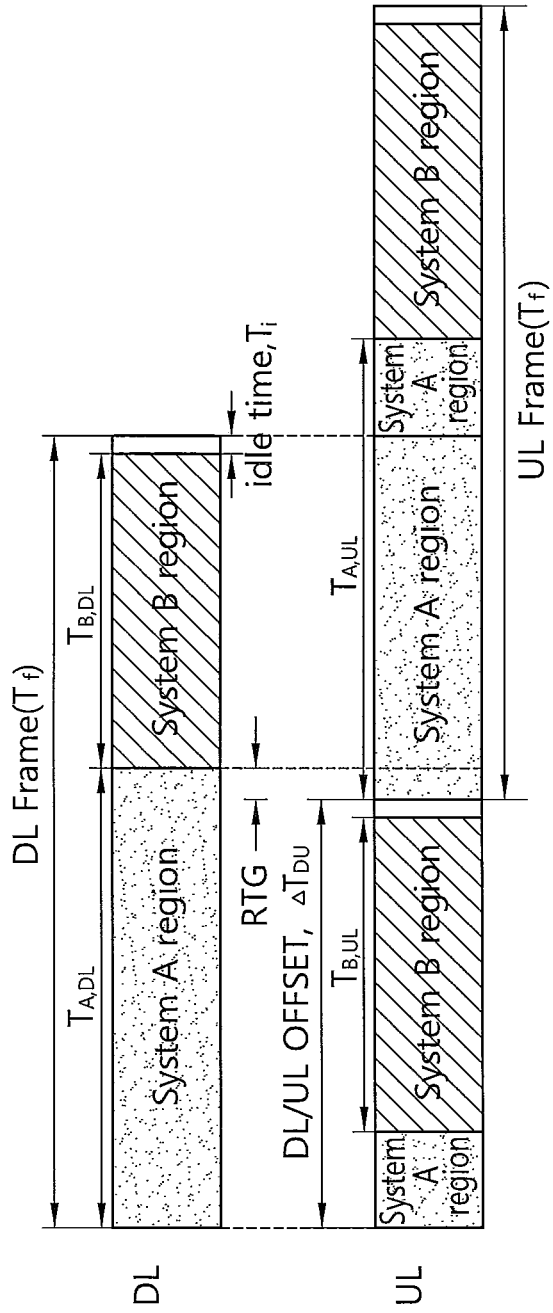
FIG. 12 shows an FDD frame structure supporting heterogeneous systems and an H-FDD scheme according to another embodiment of the present invention.

FIG. 12 shows an FDD frame structure supporting heterogeneous systems and an H-FDD scheme according to another embodiment of the present invention.

Referring to FIG. 12, a start point of a UL frame is shifted from a start point of a DL frame in a time domain by a system A region of the DL frame (i.e., $T_{A,DL}$) and a DL/UL offset having a -RTG size of a system B (herein, the negative sign '-' indicates shifting is made in a temporally preceding direction (i.e., to the left)).

Equation 7 shows another example of a DL/UL offset $\Delta T_{DU}$.

$$\Delta T_{DU} = T_{A,DL} - RTG \qquad \text{[Equation 7]}$$

A start of the UL frame is located in a position preceding by an RTG of the system B in a boundary between the system A region and the system B region of the DL frame.

Since a system B region of a DL frame (i.e., $T_{B,DL}$) is separated from a system B region of a UL frame (i.e., $T_{B,UL}$) by an RTG and an idle time $T_i$, the system B does not have to allocate the RTG additionally. In the system B region, a region except for the temporally overlapping portion can be allocated to the H-FDD type UE without limitation.

Figure 13:
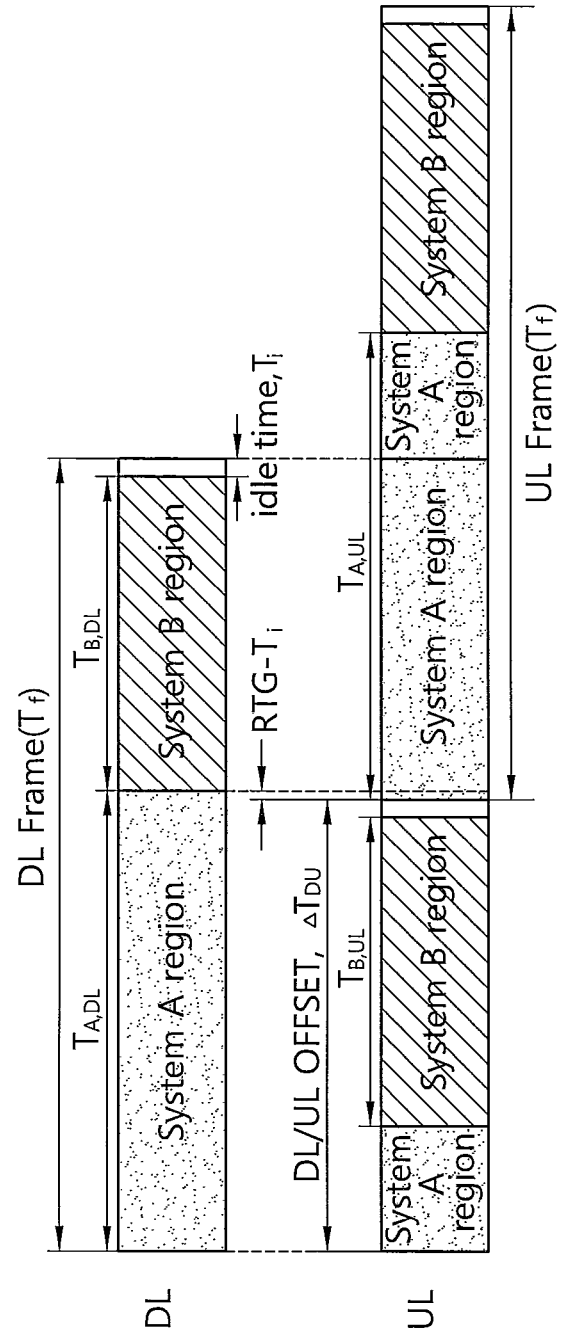
FIG. 13 shows an FDD frame structure supporting heterogeneous systems and an H-FDD scheme according to another embodiment of the present invention.

FIG. 13 shows an FDD frame structure supporting heterogeneous systems and an H-FDD scheme according to another embodiment of the present invention.

Referring to FIG. 13, a start point of a UL frame is shifted from a start point of a DL frame in a time domain by a system A region of the DL frame (i.e., $T_{A,DL}$), a -RTG of a system B, and a DL/UL offset having a size of an idle time $T_i$.

Equation 8 shows another example of a DL/UL offset $\Delta T_{DU}$.

$$\Delta T_{DU} = T_{A,DL} - RTG + T_i \qquad \text{[Equation 8]}$$

A start of the UL frame is located in a position preceding by RTG-$T_i$, i.e., a size obtained by subtracting an idle time $T_i$ from the RTG of the system B, in a boundary between the system A region and the system B region of the DL frame.

Since a system B region of a DL frame (i.e., $T_{B,DL}$) is separated from a system B region of a UL frame (i.e., $T_{B,UL}$) by an RTG, the system B does not have to allocate the RTG additionally. In the system B region, a region except for the temporally overlapping portion can be allocated to the H-FDD type UE without limitation.

According to the present invention, when a half-duplex FDD (H-FDD)-type user equipment is supported in a frequency division duplex (FDD) frame supporting heterogeneous systems, radio resources can be effectively utilized by minimizing waste of unnecessary radio resources.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of allocating a radio resource in a frequency division duplex (FDD) frame in which a downlink frame and an uplink frame are divided in a frequency domain in a wireless communication system, the method comprising:

allocating a first downlink resource region for a first system and a second downlink resource region for a second system in the downlink frame, the first downlink resource region and the second downlink resource region being allocated in a specific order, and the first downlink resource region being divided in time division duplex (TDD) manner for a half-duplex FDD (H-FDD) type user equipment (UE) and for a FDD type UE, respectively; and allocating a first uplink resource region for the first system and a second uplink resource region for the second system in the uplink frame, the first uplink resource region and the second uplink resource region being allocated in an opposite order of the specific order, and the first uplink resource region being divided in TDD manner for the H-FDD type UE and for the FDD type UE, respectively, wherein the first system and the second system are heterogeneous wireless communication systems using different communication schemes.

2. The method of claim 1, wherein the first downlink resource region for the first system and the second downlink resource region for the second system are divided temporally in the downlink frame.

3. The method of claim 1, wherein the first uplink resource region for the first system and the second uplink resource region for the second system are divided temporally in the uplink frame.

4. The method of claim 1, wherein an idle time is added to a temporally last portion in the downlink frame and the uplink frame.

5. The method of claim 1, wherein the downlink frame and the uplink frame have a different start point by a specific time offset so that the first downlink resource region for the first system and the first uplink resource region for the first system do not temporally overlap with each other.

6. The method of claim 1, wherein the first system is an Institute of Electrical and Electronics Engineers (IEEE) 802.16e system, and wherein the second system is an IEEE 802.16m system.

* * * * *